US012453821B2

(12) United States Patent
Xiong et al.

(10) Patent No.: US 12,453,821 B2
(45) Date of Patent: Oct. 28, 2025

(54) INJECTOR PEN AND DOSE ADJUSTMENT MECHANISM THEREOF

(71) Applicant: SUZHOU HEALTHY TREE MEDICAL TECHNOLOGY CO., LTD, Jiangsu (CN)

(72) Inventors: Changyan Xiong, Jiangsu (CN); Huashun Li, Jiangsu (CN); Sixian He, Jiangsu (CN)

(73) Assignee: SUZHOU HEALTHY TREE MEDICAL TECHNOLOGY CO., LTD (CN)

( * ) Notice: Subject to any disclaimer, the term of this patent is extended or adjusted under 35 U.S.C. 154(b) by 0 days.

(21) Appl. No.: 18/861,729

(22) PCT Filed: Apr. 1, 2024

(86) PCT No.: PCT/CN2024/085211
§ 371 (c)(1),
(2) Date: Oct. 30, 2024

(87) PCT Pub. No.: WO2025/152271
PCT Pub. Date: Jul. 24, 2025

(65) Prior Publication Data
US 2025/0288747 A1    Sep. 18, 2025

(30) Foreign Application Priority Data

Jan. 16, 2024 (CN) .......................... 202410058074.4

(51) Int. Cl.
*A61M 5/315* (2006.01)
*A61M 5/20* (2006.01)

(52) U.S. Cl.
CPC .......... *A61M 5/31551* (2013.01); *A61M 5/20* (2013.01); *A61M 5/31528* (2013.01); *A61M 5/3158* (2013.01); *A61M 2005/2026* (2013.01)

(58) Field of Classification Search
CPC ................ A61M 5/31551; A61M 5/20; A61M 5/31528; A61M 5/3158; A61M 2005/2026
See application file for complete search history.

(56) References Cited

U.S. PATENT DOCUMENTS 8,808,250 B2    8/2014 Ekman et al.
2003/0050609 A1*  3/2003 Sams ................ A61M 5/31553
604/208

(Continued)

FOREIGN PATENT DOCUMENTS

CN    106456888 A    2/2017
CN    106696213 A    5/2017

(Continued)

OTHER PUBLICATIONS

Search Report issued in International Application No. PCT/CN2024/085211.

(Continued)

*Primary Examiner* — Tasnim Mehjabin Ahmed
(74) *Attorney, Agent, or Firm* — The Belles Group, P.C.

(57) ABSTRACT

A dose adjustment mechanism includes a power rod, a cylinder, a ball, a sleeve and a torsion spring; the cylinder is outer-mounted on the power rod, a spiral channel extending along the axial direction of the power rod is formed between the inner wall of the cylinder and the outer wall of the power rod, and the ball is rollable in the spiral channel; the cylinder and the upper pen holder of the injector pen are relatively fixed in the circumferential direction; the upper end of the torsion spring is relatively fixed to the upper pen holder, and the lower end is connected to the sleeve; the power rod rotates relative to the cylinder under the action of an external force; the sleeve is limitedly connected to the power rod in (Continued)

a circumferential direction, and the sleeve is configured for transmission cooperation with the transmission mechanism of the injector pen.

20 Claims, 8 Drawing Sheets

(56) References Cited

U.S. PATENT DOCUMENTS

| | | |
|---|---|---|
| 2004/0210199 A1 | 10/2004 | Atterbury et al. |
| 2017/0119973 A1* | 5/2017 | Roervig .................. A61M 5/20 |
| 2021/0016013 A1 | 1/2021 | Wallace et al. |

FOREIGN PATENT DOCUMENTS

| | | |
|---|---|---|
| CN | 209951946 U | 1/2020 |
| CN | 113144341 A | 7/2021 |
| CN | 116271336 A | 6/2023 |
| CN | 219231020 U | 6/2023 |
| CN | 219835963 U | 10/2023 |
| CN | 117563084 A | 2/2024 |
| CN | 117563085 A | 2/2024 |
| CN | 117563086 A | 2/2024 |

OTHER PUBLICATIONS

Office Action issued in counterpart Danish Application No. PA202570076 on Sep. 5, 2025.

* cited by examiner

INJECTOR PEN AND DOSE ADJUSTMENT MECHANISM THEREOF

This application is a National Phase entry of PCT Application No. PCT/CN2024/085211, filed on Apr. 1, 2024, which claims priority to Chinese Patent Application No. 202410058074.4, titled "INJECTOR PEN AND DOSE ADJUSTMENT MECHANISM THEREOF", filed on Jan. 16, 2024 with the China National Intellectual Property Administration, which are incorporated herein by reference in their entireties.

FIELD

The present application relates to the technical field of medical devices, and in particular to an injector pen and a dose adjustment mechanism of the injector pen.

BACKGROUND

Insulin injection therapy is the most commonly used treatment method in clinical work, which engenders injector pens for insulin injection. The injector pens can be used repeatedly and adjust the injection dose accurately. Only cartridges containing insulin need to be replaced. In addition to insulin injection, the injector pens can also be used for injecting other drugs.

In the related art, an injector pen includes an upper pen holder assembly and a lower pen cap. The upper pen holder assembly includes a button mechanism, a dose adjustment mechanism and a transmission mechanism. The lower pen cap is used for mounting the cartridge. The kinetic energy can be stored by operating the dose adjustment mechanism. Under pressing operation of a button mechanism, the kinetic energy stored in the dose adjustment mechanism can be released, and the plunger of the cartridge can be pushed through the transmission mechanism to achieve drug injection.

In order to achieve precise control of drug injection, the dose adjustment mechanism generally adopts the ball screw principle. However, in the conventional dose adjustment mechanism, the ball may not be reset in the process of releasing kinetic energy after the kinetic energy is stored, and since too many components are included, reliability of the injector pen is reduced.

SUMMARY

The purpose of the present application is to provide an injector pen and a dose adjustment mechanism of the injector pen. Through structural optimization, the rolling smoothness of the ball in the dose adjustment mechanism can be ensured, so that the ball can be smoothly reset, and the reliability and safety of the injector pen are improved.

In order to solve the above technical problems, a dose adjustment mechanism of an injector pen is provided according to embodiments of the present application. The dose adjustment mechanism includes a power rod, a cylinder, a ball, a sleeve and a torsion spring. The cylinder is mounted outside the power rod, and a spiral channel extending along an axis direction of the power rod is formed between an inner wall of the cylinder and an outer wall of the power rod, and the ball is rollable in the spiral channel. The cylinder and an upper pen holder of the injector pen are relatively fixed in a circumferential direction; an upper end of the torsion spring is relatively fixed to the upper pen holder, and a lower end of the torsion spring is connected to the sleeve. The power rod is rotatable relative to the cylinder when an external force is applied on the power rod; the sleeve is limitedly connected with the power rod in the circumferential direction, and the sleeve is configured for transmission cooperation with a transmission mechanism of the injector pen.

In an embodiment, the sleeve includes a rod insertion portion, the power rod includes a socket portion extending along the axial direction, the rod insertion portion is inserted into the socket portion, an outer peripheral wall of the rod insertion portion has a flat portion in the circumferential direction, and an inner hole wall of the socket portion has a flat wall that cooperates with the flat portion.

In an embodiment, the dose adjustment mechanism further includes an axial limiting structure between the power rod and the sleeve to limit a relative position of the power rod and the sleeve in the axial direction.

In an embodiment, one of the power rod and the sleeve is provided with a convex portion extending in a radial direction, and the other one of the power rod and the sleeve is provided with a concave portion, and the convex portion is configured to snap into the concave portion; the axial limiting structure includes the convex portion and the concave portion.

In an embodiment, a bottom end of the power rod has an extension portion extending downward in the axial direction, the extension portion is provided with the concave portion, the sleeve includes an inner cylinder portion, an inner cylinder wall of the inner cylinder portion close to a top end is provided with the convex portion extending inward in the radial direction.

In an embodiment, an outer wall of the sleeve near a bottom end is provided with multiple convex ribs extending outward in the radial direction, and the multiple convex ribs are arranged along a circumferential direction of the sleeve to correct a concentricity degree between the sleeve and the upper pen holder.

In an embodiment, the dose adjustment mechanism further includes a knob assembly, and a circumferential limiting structure is provided between the knob assembly and the power rod, and the knob assembly is configured to drive the power rod to rotate by the circumferential limiting structure.

In an embodiment, the power rod is configured to move relative to the cylinder towards a lower cap of the injector pen when an external force is applied on the power rod, so as to release a circumferential limit with the knob assembly.

In an embodiment, the dose adjustment mechanism further includes a torsion spring bracket, and the torsion spring bracket is relatively fixed to the upper pen holder, and the cylinder is relatively fixed to the torsion spring bracket, the torsion spring bracket is connected to the upper end of the torsion spring.

An injector pen is provided according to an embodiment of the present application. The injector pen includes an upper pen holder and a dose adjustment mechanism installed on the upper pen holder, and the dose adjustment mechanism is any of the dose adjustment mechanisms described above.

In an embodiment, the injector pen further includes a transmission mechanism, and the sleeve is configured to move downward in the axial direction relative to the upper pen holder to engage with a driving wheel of the transmission mechanism, or to move upward in the axial direction relative to the upper pen holder to separate from the driving wheel, the sleeve is in an engaged state with the driving wheel, and the sleeve is configured to drive the driving wheel to rotate; the driving wheel includes a cylindrical portion extending into the sleeve, and an outer peripheral wall of the cylindrical portion is provided with multiple convex ridges arranged in the circumferential direction, to correct the concentricity degree of the driving wheel and the sleeve.

In an embodiment, the driving wheel includes a base portion fixedly connected to a lower end of the cylindrical portion, and multiple protrusions protruding upward in the axial direction are arranged near an outer edge of the base portion, and the multiple protrusions are arranged in the circumferential direction to correct the concentricity degree of the driving wheel and the upper pen holder.

The structural arrangement of the dose adjustment mechanism of the injector pen adopts a transmission mode in which the power rod, the cylinder and the ball cooperate to achieve high transmission accuracy during the dose adjustment process of the injector pen, thereby ensuring the accuracy of drug dose adjustment; at the same time, during the process of adjusting the dose, the power rod can rotate positively relative to the cylinder, and during the process of injecting the drug, the power rod can still rotate relative to the cylinder, that is, during the process of storing energy and releasing the stored energy of the torsion spring, the power rod can rotate relative to the cylinder, so that the ball rolls smoothly and resets reliably, thereby ensuring the accuracy of dose adjustment and providing reliability and safety of the injector pen operation.

Figure 1:
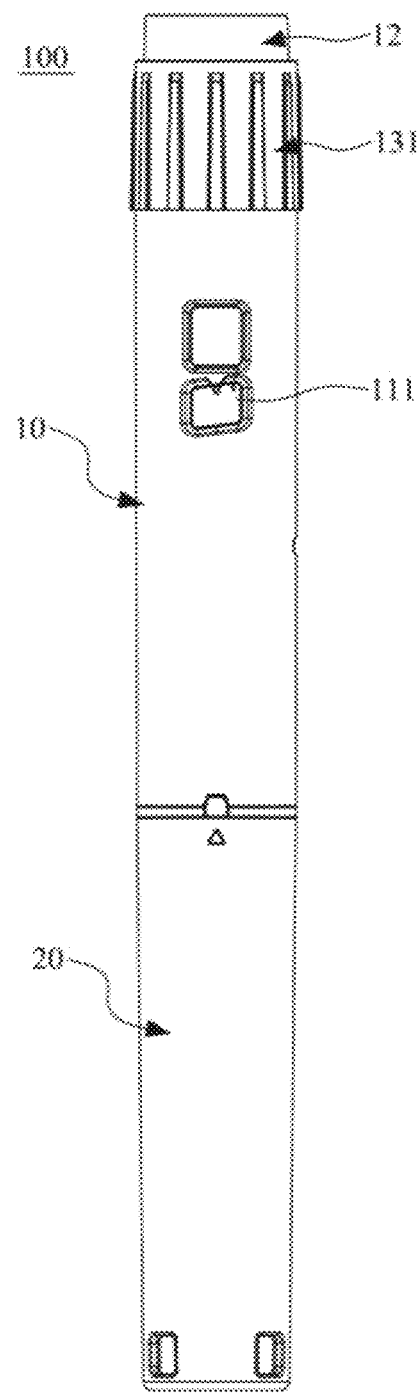
FIG. 1 is a schematic structural diagram of an injector pen according to an embodiment of the present application.

| Reference numerals: | | |
|---|---|---|
| 100: injector pen; | 10: upper pen holder assembly; | 20: lower pen cap assembly; |
| 11: upper pen holder; | 111: display window; | 12: button mechanism; |
| 121: button assembly; | 123: reset elastic member; | 13: dose adjustment mechanism; |
| 131: knob assembly; | 1311: knob; | 1312: stop bracket; |
| 13121: first inner gear ring; | 132: power rod; | 1321: socket portion; |
| 1322: extension portion; | 1323: concave portion; | 1324: first latch tooth; |
| 133: cylinder; | 134: ball; | 135: sleeve; |
| 1351: rod insertion portion; | 13511: flat portion; | 1352: inner cylinder portion; |
| 1353: outer cylinder portion; | 1354: convex portion; | 1355: convex rib; |
| 1356: second inner gear ring; | 136: torsion spring; | 137: torsion spring bracket; |
| 138: dial; | 14: transmission mechanism; | 141: driving wheel; |
| 1411: cylindrical portion; | 1412: base portion; | 1413: convex ridge; |
| 1414: protrusion; | 1415: second latch tooth; | 142: screw; |
| 143: bottle holder cover; | 21: lower pen cap; | 22: bottle holder; |
| 23: cartridge bottle; | 231: bottle stopper. | |

DETAILED DESCRIPTION OF EMBODIMENTS

An injector pen and a dose adjustment mechanism of the injector pen are provided according to embodiments of the present application. By optimizing the structure of the dose adjustment mechanism, the rolling smoothness of the ball can be improved to ensure that the ball can be smoothly reset.

For the convenience of understanding and concise description, the following is a description of the injector pen and a dose adjustment mechanism of the injector pen, and the specific embodiment is described in detail with the injector pen shown in the attached figure as the description subject.

In this application, a side where the button mechanism of the injector pen is located is defined as the upper side. Accordingly, the injection end of the injector pen or a side close to the injection site when in use is defined as the lower side. The length direction of the injector pen is defined as the axial direction, a side close to the center of the injector pen is the inner side, and accordingly, a side away from the center of the injector pen is the outer side. It can be understood that the use of the directional words is only for the convenience of description and understanding, which does not constitute a limitation on the scope of protection.

Figure 2:
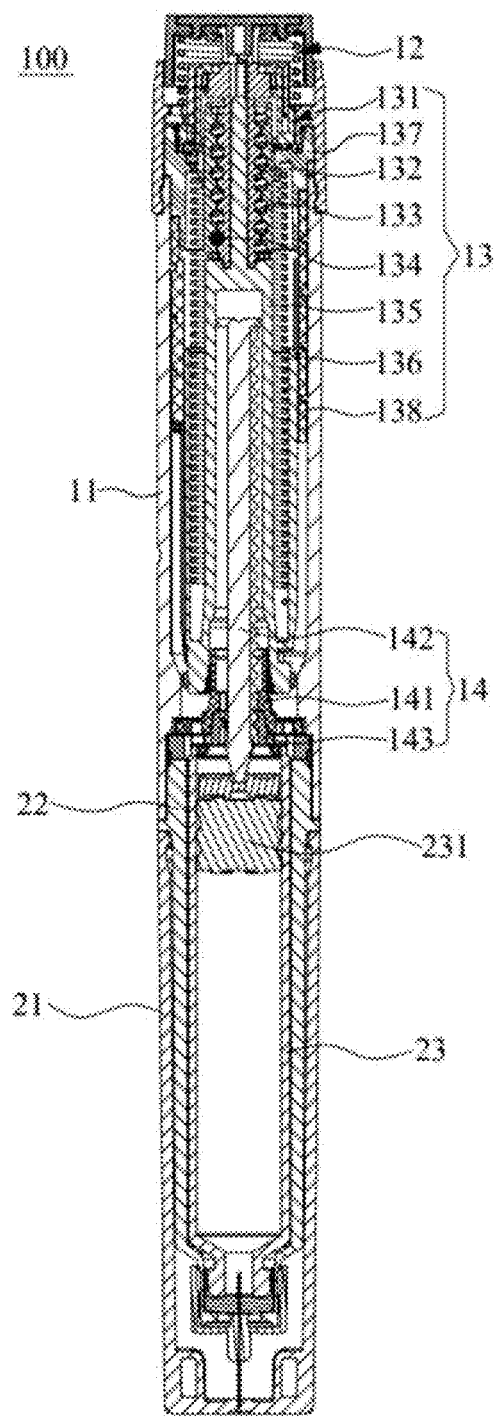
FIG. 2 is a schematic cross-sectional diagram of the injector pen shown in FIG. 1 in a first state.
Figure 3:
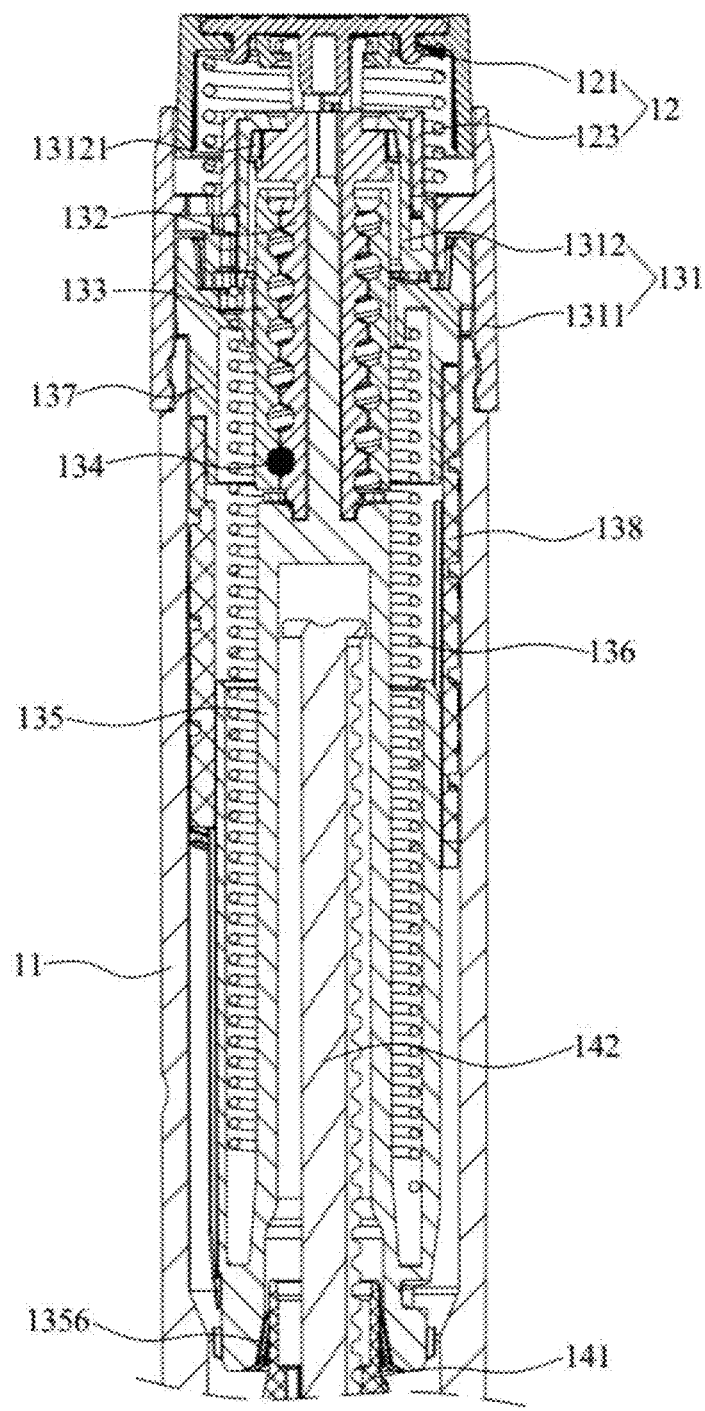
FIG. 3 is a partial enlarged diagram of an region where the upper pen holder assembly is located in FIG. 2.

Referring to FIG. 1 to FIG. 3, FIG. 1 is a schematic structural diagram of the injector pen according to an embodiment of the present application; FIG. 2 is a schematic cross-sectional diagram of the injector pen shown in FIG. 1 in the first state; FIG. 3 is a partial enlarged view of the region where the upper pen holder assembly is located in FIG. 2.

In an embodiment, the injector pen 100 includes an upper pen holder assembly 10 and a lower pen cap assembly 20.

The upper pen holder assembly 10 includes an upper pen holder 11, a button mechanism 12, a dose adjustment mechanism 13 and a transmission mechanism 14. The upper pen holder 11 serves as an installation base for the button mechanism 12, the dose adjustment mechanism 13 and the transmission mechanism 14.

The lower pen cap assembly 20 includes a lower pen cap 21, a bottle holder 22 and a cartridge bottle 23. The bottle holder 22 is inserted into the lower pen cap 21 for installing the cartridge bottle 23. The upper end of the bottle holder 22 extends out of the lower pen cap 21 to be connected with the upper pen holder 11. The lower end of the upper pen holder 11 is outer-mounted on the upper end of the bottle holder 22.

The transmission mechanism 14 in the upper pen holder 11 can cooperate with a bottle stopper 231 of the cartridge bottle 23. The dose adjustment mechanism 13 can provide driving force to the transmission mechanism 14, so that the transmission mechanism 14 pushes the bottle stopper 231 downward to achieve drug injection.

It should be pointed out that the cartridge bottle 23 is a container for storing drugs, which is actually not a part of the injector pen 100, but used in conjunction with the injector pen 100. In application, the cartridge bottle 23 is a replaceable component.

In an embodiment, the dose adjustment mechanism 13 of the injector pen 100 includes a power rod 132, a cylinder 133, a ball 134, a sleeve 135 and a torsion spring 136.

The cylinder 133 is mounted outside the power rod 132, and a spiral channel extending along the axial direction of the power rod 132 is formed between the inner wall of the cylinder 133 and the outer wall of the power rod 132, and the ball 134 is rollable in the spiral channel. Among them, the axial direction of the power rod 132 is consistent with the axial direction of the injector pen 100.

The cylinder 133 is relatively fixed to the upper pen holder 11 in the circumferential direction; the upper end of the torsion spring 136 is relatively fixed to the upper pen holder 11, and the lower end of the torsion spring 136 is connected to the sleeve 135; the power rod 132 is limitedly connected with the sleeve 135 in a circumferential direction. In other words, the power rod 132 and the sleeve 135 may not rotate relative to each other, but may rotate together; the sleeve 135 and the transmission mechanism 14 may switch between a transmission engagement state and a transmission separation state. In other words, when the sleeve 135 and the transmission mechanism 14 are in a transmission engagement state, power transmission may be achieved between the two, and when the sleeve 135 and the transmission mechanism 14 are in a transmission separation state, power transmission may not be achieved between the two.

Under the action of external force, the power rod 132 may rotate relative to the cylinder 133 and drive the sleeve 135 to rotate together.

During operation, an external force may be applied to the power rod 132 to rotate the power rod 132 in the direction of adjusting injection dose. When the power rod 132 rotates, the sleeve 135 may be driven to rotate together, but the cylinder 133 does not move. In this way, the ball 134 may roll in one direction along the spiral channel between the power rod 132 and the cylinder 133. Since the upper end of the torsion spring 136 is relatively fixed to the upper pen holder 11 and the lower end is connected to the sleeve 135, the lower end of the torsion spring 136 rotates with the sleeve 135 to store energy. After rotating to the required injection dose position, the power rod 132, sleeve 135 and torsion spring 136 may be kept in this position; afterwards, the stored energy of torsion spring 136 may be released by operation, that is, the position lock of power rod 132, sleeve 135 and torsion spring 136 is released, and sleeve 135 and transmission mechanism 14 are in a transmission engagement state. Under the release of the stored energy of torsion spring 136, the power rod 132 and the sleeve 135 rotate in the opposite direction, and the driving force is transmitted to the transmission mechanism 14 through the engagement of the sleeve 135 and the transmission mechanism 14, thereby pushing the bottle stopper 231 to move downward to achieve drug injection. When the power rod 132 and the sleeve 135 rotate in the opposite direction, the cylinder 133 does not move, so that the ball 134 may roll in the opposite direction and reset.

According to the above operation, the rotation degree of the sleeve 135 driven by the power rod 132 determines the stored energy of the torsion spring 136, and the stored energy of the torsion spring 136 is related to the stroke of pushing the bottle stopper 231 downward, that is, related to the dose of drug injection.

It can be understood that the reverse rotation of the power rod 132 and the sleeve 135 refers to the rotation in the opposite direction to the aforementioned rotation in the direction of adjusting the injection dose, and the reverse rolling of the ball 134 is also the rolling in the opposite direction to the previous direction.

Herein the rotation in the direction of adjusting the dose is defined as positive rotation, and correspondingly, the rotation in the direction opposite to the adjustment dose is the reverse rotation.

With the above scheme, the injector pen 100 adopts a transmission mode in which the power rod 132, the cylinder 133 and the ball 134 cooperate in the process of adjusting the dose, and the transmission accuracy is high, which can ensure the accuracy of the drug dose adjustment; at the same time, in the process of adjusting the dose, the power rod 132 can rotate forward relative to the cylinder 133, and in the process of injecting the drug, the power rod 132 can still rotate relative to the cylinder 133, so that the ball 134 rolls smoothly and resets reliably, thereby ensuring the accuracy of the dose adjustment and providing the reliability and safety of the operation of the injector pen 100.

In an embodiment, the dose adjustment mechanism 13 further includes a knob assembly 131, and a circumferential limiting structure is provided between the knob assembly 131 and the power rod 132. When the knob assembly 131 rotates, the power rod 132 may be driven to rotate through the circumferential limiting structure.

In a specific implementation, the knob assembly 131 includes a knob 1311 and a stop bracket 1312, and the knob 1311 and the stop bracket 1312 are connected in a circumferential limiting manner, and a portion of the stop bracket 1312 is internally mounted in the knob 1311, and the lower end of the knob 1311 is rotatably mounted outside the upper pen holder 11.

In an embodiment, the power rod 132 passes through the stop bracket 1312, and a circumferential limiting structure is provided between the power rod 132 and the stop bracket 1312.

Figure 4:
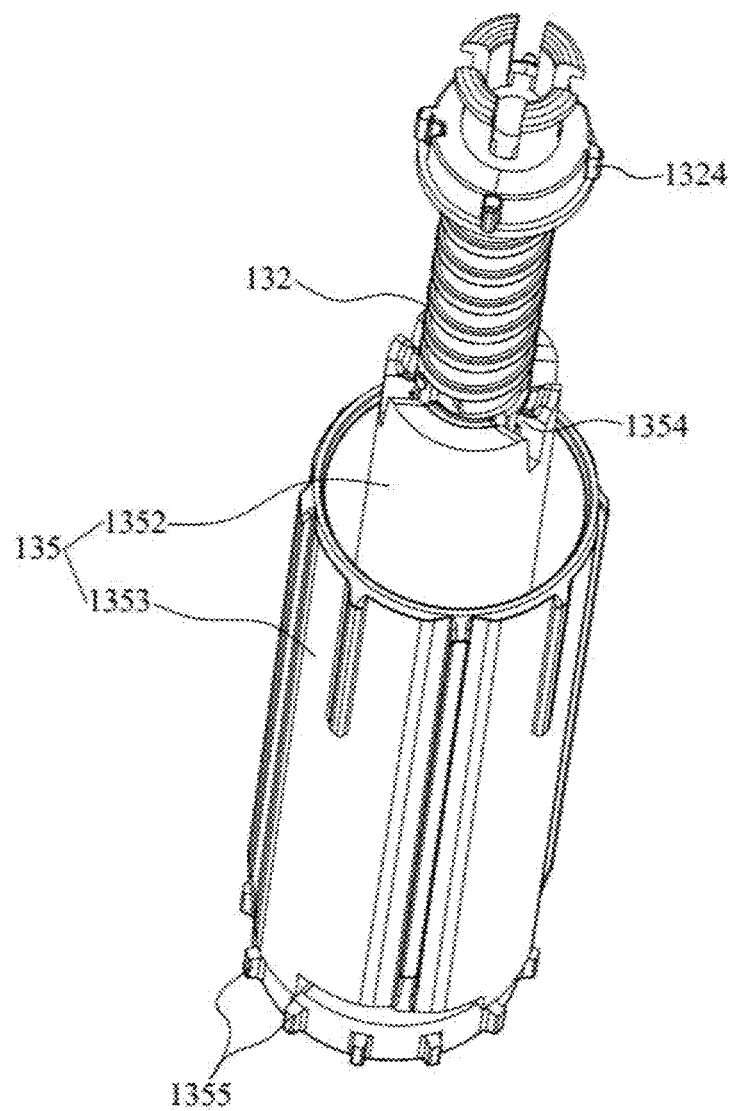
FIG. 4 is a schematic structural diagram of the matching of the power rod and the sleeve in a specific embodiment.

Specifically, the circumferential limiting structure between the stop bracket 1312 and the power rod 132 includes a first inner gear ring 13121 on the stop bracket 1312, and a first latch tooth 1324 (marked in FIGS. 4 to 6) on the outer wall of the power rod 131. Under normal conditions, the first latch tooth 1324 of the power rod 131 may be embedded in the tooth groove of the first inner gear ring 13121, thereby limiting the circumferential position of the power rod 131 and the stop bracket 1312, so that the stop bracket 1312 may drive the power rod 132 to rotate together.

In the illustrated example, the power rod 131 is provided with four first latch teeth 1324 along the circumferential direction. In actual applications, the quantity of the first latch teeth 1324 of the power rod 131 may be set to other numbers, such as two or three or more. It is best to evenly arrange the multiple first latch teeth 1324 along the circumferential direction to balance the force between the power rod 131 and the stop bracket 1312.

In other implementations, a circumferential limiting structure may also be provided between the power rod 132 and the knob 1311.

In application, the user may rotate the knob 1311 to drive the stop bracket 1312 and the power rod 132 to rotate together to adjust the dose.

In an embodiment, the dose adjustment mechanism 13 further includes a torsion spring bracket 137, which is relatively fixed to the upper pen holder 11, and the cylinder 133 is sleeved in the torsion spring bracket 137. The cylinder 133 may be relatively fixed to the upper pen holder 11 by relative fixation with the torsion spring bracket 137.

The relative fixing method of the torsion spring bracket 137 and the upper pen holder 11 and the relative fixing method of the cylinder 133 and the torsion spring bracket 137 may both adopt the method of snap-fitting structure, which is convenient for disassembly and assembly and is conducive to maintenance.

The upper end of the aforementioned torsion spring 136 may be specifically connected to the torsion spring bracket 137.

In a specific implementation, a limiting structure is provided between the knob assembly 131 and the torsion spring bracket 137, and the limiting structure is arranged so that the knob assembly 131 can only rotate in one direction relative to the torsion spring bracket 137, but cannot rotate in the reverse direction. In the structural configuration of the injector pen 100, the knob assembly 131 can rotate forward relative to the torsion spring bracket 137, but cannot rotate in the reverse direction. In this way, after the knob assembly 131 drives the power rod 132 to rotate forward to the position where the dose is required to be adjusted, the power rod 132, the sleeve 135 and the torsion spring 136 can be kept in this position.

In an embodiment, the limiting structure between the knob assembly 131 and the torsion spring bracket 137 can be a one-way ratchet gear matching structure.

In an embodiment, the power rod 132 may move relative to the cylinder 133 in the direction of the lower pen cap 21 of the injector pen 100 when an external force is applied on the power rod 132, so as to release the circumferential limit between the power rod 132 and the knob assembly 131. In other words, the power rod 132 can move downward relative to the upper pen holder 11 when the external force is applied on the power rod 132, so as to disengage from the circumferential limit with the knob assembly 131, and further release the energy stored in the torsion spring 136. It can be understood that after the power rod 132 is disengaged from the circumferential limit with the knob assembly 131, the power rod 132 is not constrained by the knob assembly 131, and the sleeve 135 and the torsion spring 136 are no longer constrained. The energy stored in the torsion spring 136 may be released, driving the sleeve 135 and the power rod 132 to rotate in the opposite direction.

Specifically, when the power rod 132 moves downward along the axial direction, the first latch tooth 1324 moves downward accordingly, and the axial position of the stop bracket 1312 of the knob assembly 131 remains unchanged, so that the first latch tooth 1324 disengages from the first inner gear ring 13121, thereby releasing the circumferential limit between the power rod 132 and the knob assembly 131.

In an embodiment, the sleeve 135 may move downward in the axial direction relative to the upper pen holder 11 to engage with the transmission mechanism 14 to achieve power transmission, or move upward in the axial direction relative to the upper pen holder 11 to separate from the transmission mechanism 14 to achieve power cutoff.

In a specific implementation, the sleeve 135 and the power rod 132 are limited and connected in the axial direction, so as to move along the axial direction together when an external force is applied on the sleeve 135 and the power rod 132.

In a specific implementation, the button mechanism 12 of the aforementioned injector pen 100 serves as a structure that can apply a downward force to the power rod 132.

The button mechanism 12 includes a button assembly 121 and a reset elastic member 123, and the button assembly 121 is limited and connected to the power rod 132 along the axial direction.

During operation, the button mechanism 12 is pressed downward, and the button mechanism 12 may drive the power rod 132 and the sleeve 135 to move downward together, release the circumferential limit connection between the power rod 132 and the knob assembly 131, and make the sleeve 135 engage with the transmission mechanism 14. In this way, the stored energy of the torsion spring 136 may be released to drive the sleeve 135 and the power rod 132 to rotate in the opposite direction. At this time, the sleeve 135 is engaged with the transmission mechanism 14, and the sleeve 135 may transmit power to the transmission mechanism 14 when being rotated, so as to achieve pushing the bottle stopper 231. After the button assembly 121 is pressed, the reset elastic member 123 stores energy, which is used to reset the button assembly 121 after the pressing force on the button mechanism 12 is cancelled.

In terms of layout, the button mechanism 12, the dose adjustment mechanism 13 and the transmission mechanism 14 are arranged roughly from top to bottom; the main body of the sleeve 135 of the dose adjustment mechanism 13 is located below the power rod 132.

In an embodiment, a dial 138 is further mounted outside the sleeve 135, and the sleeve 135 and the dial 138 are limitedly connected in the circumferential direction. The outer side of the dial 138 is the upper pen holder 11, and the upper pen holder 11 has a display window 111. When the dose is adjusted, the dial 138 may rotate with the sleeve 135, so that the user may determine the adjusted dose through the scale on the dial 138 displayed in the display window 111.

Figure 5:
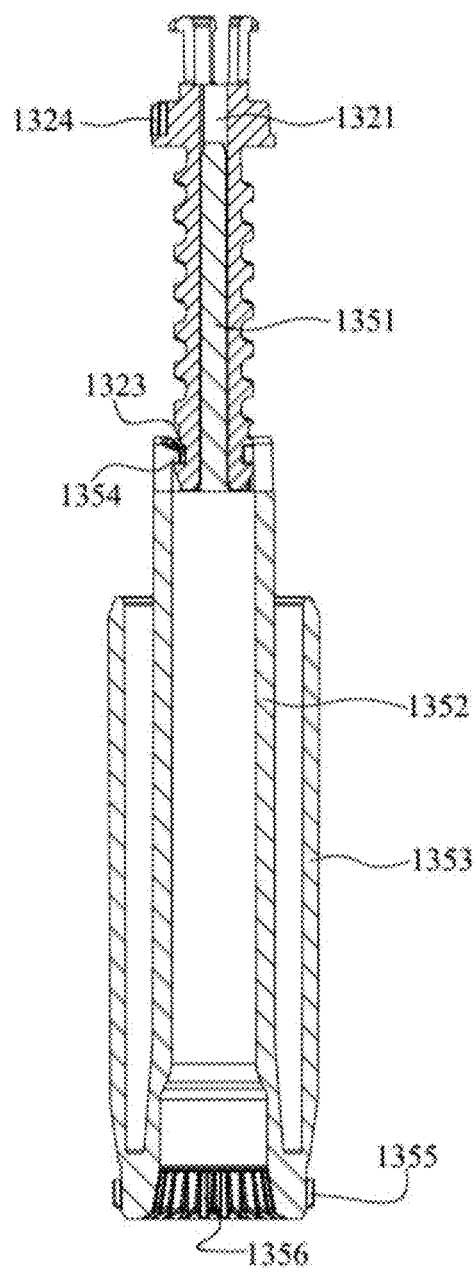
FIG. 5 is a schematic cross-sectional diagram of the power rod and the sleeve shown in FIG. 4.
Figure 6:
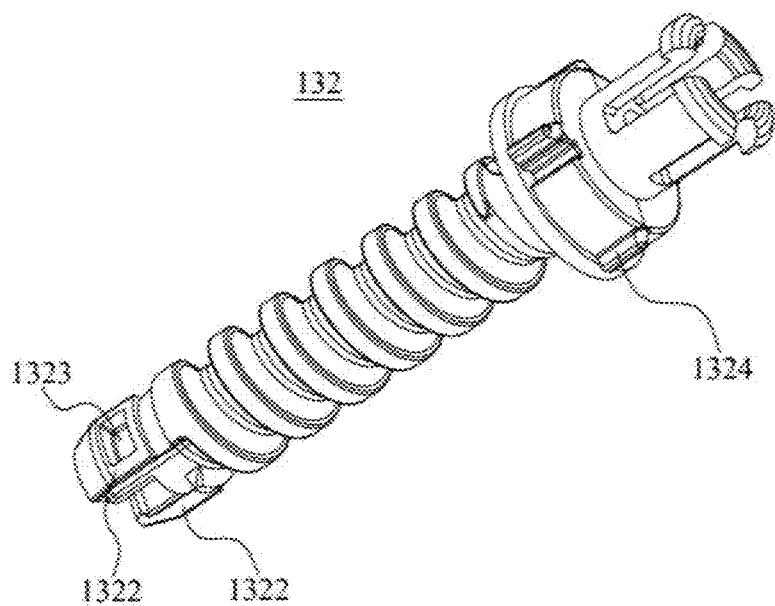
FIG. 6 is a schematic structural diagram of the power rod in FIG. 4.
Figure 7:
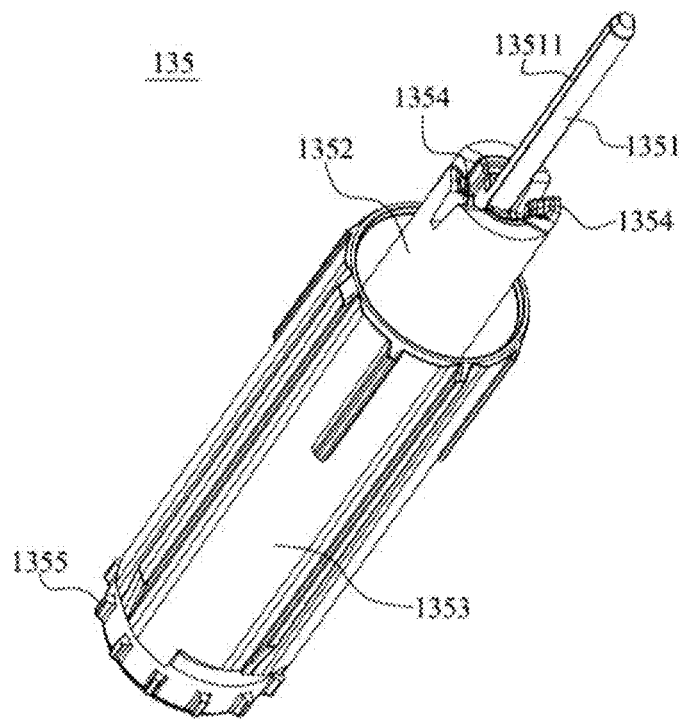
FIG. 7 is a schematic structural diagram of the sleeve in FIG. 4.

Referring to FIG. 4 to FIG. 7, FIG. 4 is a schematic structural diagram of matching of the power rod and the sleeve in a specific embodiment; FIG. 5 is a cross-sectional schematic diagram of the power rod and the sleeve shown in FIG. 4; FIG. 6 is a structural schematic diagram of the power rod in FIG. 4; FIG. 7 is a structural schematic diagram of the sleeve in FIG. 4.

In an embodiment, the power rod 132 has a socket portion 1321 extending along the axial direction, and the sleeve 135 includes a rod insertion portion 1351, which is inserted into the socket portion 1321 of the power rod 132. The outer peripheral wall of the rod insertion portion 1351 has a flat portion 13511 in the circumferential direction, and the inner hole wall of the socket portion 1321 has a flat wall that matches the flat portion 13511. In this way, after the rod insertion portion 1351 of the sleeve 135 is inserted into the socket portion 1321 of the power rod 132, the power rod 132 may drive the sleeve 135 to rotate together under the action of the mutually matching flat portion 13511 and the flat wall. Apparently, the flat portion 13511 and the plane wall constitute a circumferential limit connection structure between the power rod 132 and the sleeve 135.

In the specific implementation, cross-sections of the rod insertion portion 1351 and the socket portion 1321 mutually matched may be non-circular structures, such as rectangles, squares, triangles or polygons; the cross-sections may also be other irregular shapes with planar structures.

The axial limiting structure between the power rod 12 and the sleeve 135 may have various forms. The following is a relatively simple and reliable method.

A convex portion 1354 extending inward in the axial direction is provided on the sleeve 135, and a concave portion 1323 cooperating with the convex portion 1354 is provided on the power rod 132. After the rod insertion portion 1351 of the sleeve 135 is inserted into the socket portion 1321 of the power rod 132, the convex portion 1354 of the sleeve 135 may snap into the concave portion 1323 of the power rod 132. As shown in FIG. 5, the sleeve 135 and the power rod 12 along the axial direction is limited by the engagement of the convex portion 1354 and the concave portion 1323.

In a specific implementation, the bottom end of the power rod 132 near the sleeve 135 has an extension portion 1322 extending downward along the axial direction, and the concave portion 1323 is formed on the side wall of the extension portion 1322 facing the sleeve 135. The concave portion 1323 may be in the form of a groove or a hole.

The sleeve 135 includes an inner cylinder portion 1352 connected to the rod insertion portion 1351, and the inner cylinder wall of the inner cylinder portion 1352 near the top is provided with the aforementioned convex portion 1354. After assembly, the extension portion 1322 of the power rod 132 may extend into the inner cylinder portion 1352. The bottom end of the rod insertion portion 1351 is located partially in the inner cylinder portion 1352 to facilitate the engagement of the convex portion 1354 and the concave portion 1323.

In other implementations, the aforementioned convex portion 1354 and the concave portion 1323 may be set in reverse, that is, the convex portion 1354 is set on the power rod 132, and the concave portion 1323 is set on the sleeve 135.

The sleeve 135 further includes an outer cylinder portion 1353 which is mounted outside the inner cylinder portion 1352. The bottom ends of the inner cylinder portion 1352 and the outer cylinder portion 1353 are connected together, and a space for accommodating the aforementioned torsion spring 136 is formed between the inner cylinder portion 1352 and the outer cylinder portion 1353. A hook hole may be provided at the bottom end of the sleeve 135, so as to facilitate hooking and connecting with the lower end of the torsion spring 136.

Specifically, more than two groups of mutually matching concave portions 1323 and convex portions 1354 of the power rod 132 and the sleeve 135 may be provided, which are evenly arranged along the circumferential direction of the power rod 132, so that the connection between the power rod 132 and the sleeve 135 is evenly stressed to avoid deflection. In the figure, the structure of two groups of concave portions 1323 and convex portions 1354 is shown.

In a specific implementation, multiple convex ribs 1355 extending outward along the radial direction are provided on the outer wall of the sleeve 135 near the bottom end, and the multiple convex ribs 1355 are arranged along the circumferential direction of the sleeve 135 to correct the concentricity degree of the sleeve 135 and the upper pen holder 11. In this way, the deflection of the sleeve 135 may be avoided to affect the transmission effect with the transmission mechanism 14.

In an embodiment, the transmission mechanism 14 of the injector pen 100 includes a driving wheel 141, a screw 142 and a bottle holder cover 143. The driving wheel 141 may be engaged or disengaged with the sleeve 135, the screw 142 is circumferentially limited with the driving wheel 141, and is threadedly connected with the bottle holder cover 143, and the lower end of the screw 142 passes through the bottle holder cover 143 and may abut against the bottle stopper 231. Generally, a gasket is provided between the screw 142 and the bottle stopper 231.

A clutch structure is provided between the driving wheel 141 and the sleeve 135. The clutch structure may make the sleeve 135 and the driving wheel 141 in an engaged state when the sleeve 135 moves downward in the axial direction, so that the sleeve 135 may drive the driving wheel 141 to rotate together. When the sleeve 135 moves upward in the axial direction, the sleeve 135 and the driving wheel 141 can be separated, so that the rotation of the sleeve 135 does not affect the driving wheel 141.

Figure 8:
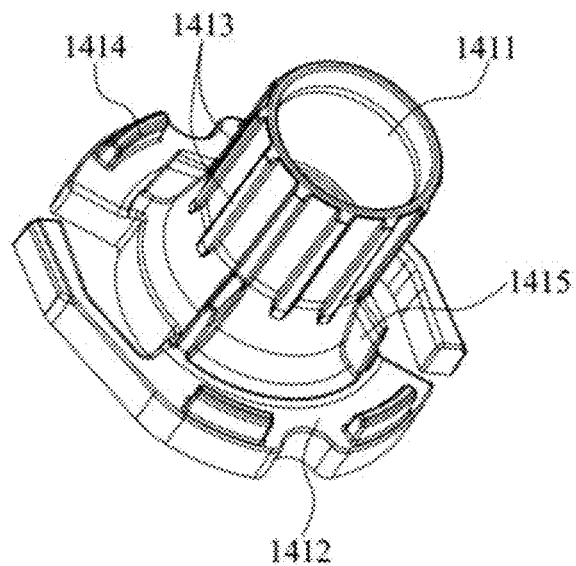
FIG. 8 is a schematic structural diagram of the driving wheel in a specific embodiment.

Referring to FIG. 8, FIG. 8 is a schematic structural diagram of the driving wheel in a specific embodiment.

In a specific implementation, the driving wheel 141 includes a cylindrical portion 1411 extending into the sleeve 135, and the outer peripheral wall of the cylindrical portion 1411 is provided with multiple convex ridges 1413 arranged in the circumferential direction to correct the concentricity degree of the driving wheel 141 and the sleeve 135. This can help ensure the engagement and separation of the sleeve 135 and the driving wheel 141, avoid the two from getting stuck, and improve the reliability of the operation of the injector pen 100.

The driving wheel 141 further includes a base portion 1412 fixed to the lower end of the cylindrical portion 1411. The base portion 1412 is provided with multiple protrusions 1414 protruding upward in the axial direction near the outer edge. The multiple protrusions 1414 are arranged circumferentially to correct the concentricity degree of the driving wheel 141 and the upper pen holder 11. In this way, it is beneficial to improve the reliability of the transmission cooperation between the driving wheel 141 and the sleeve 135.

In application, the aforementioned multiple convex ridges 1413 may be evenly arranged in the circumferential direction, and the aforementioned multiple protrusions 1414 are also evenly arranged in the circumferential direction, so that the corresponding components are more evenly stressed and more conducive to the correction of concentricity degree.

In a specific implementation, the bottom end of the sleeve 135 has a second inner gear ring 1356, and the driving wheel 141 is provided with a second latch tooth 1415. When the sleeve 135 moves downward in the axial direction, the second latch tooth 1415 on the driving wheel 141 may be embedded in the tooth groove of the second inner gear ring 1356, thereby realizing the engagement of the driving wheel 141 and the sleeve 135, so that the sleeve 135 may drive the driving wheel 141 to rotate together. When the sleeve 135 moves upward in the axial direction, the second inner gear ring 1356 is disengaged from the second latch tooth 1415 of the driving wheel 141, so that the driving wheel 141 and the sleeve 135 are separated, and the driving wheel 141 does not rotate with the sleeve 135.

In a specific implementation, the cylinder cavity of the inner cylinder portion 1352 of the sleeve 135 serves as a space for accommodating the screw 142. In other words, the bottom of the sleeve 135 is an opening structure that penetrates the cylinder cavity of its inner cylinder portion 1352.

When the dose is adjusted by rotating the knob assembly 131 and the button assembly 121 is pressed, the power rod 132 and the sleeve 135 move downward along the axial direction, the power rod 132 is separated from the circumferential limit of the knob assembly 131, and the sleeve 135 is engaged with the driving wheel 141. Under the release of the stored energy of the torsion spring 136, the power rod 132 and the sleeve 135 rotate together, driving the driving wheel 141 to rotate. When the driving wheel 141 rotates, it drives the screw 142 which is circumferentially limited to rotate together, and the screw 142 is threadedly connected to the bottle holder cover 143. Under the action of the thread, the screw 142 moves downward along the axial direction, pushing the bottle stopper 231 downward to achieve drug injection.

Figure 9:
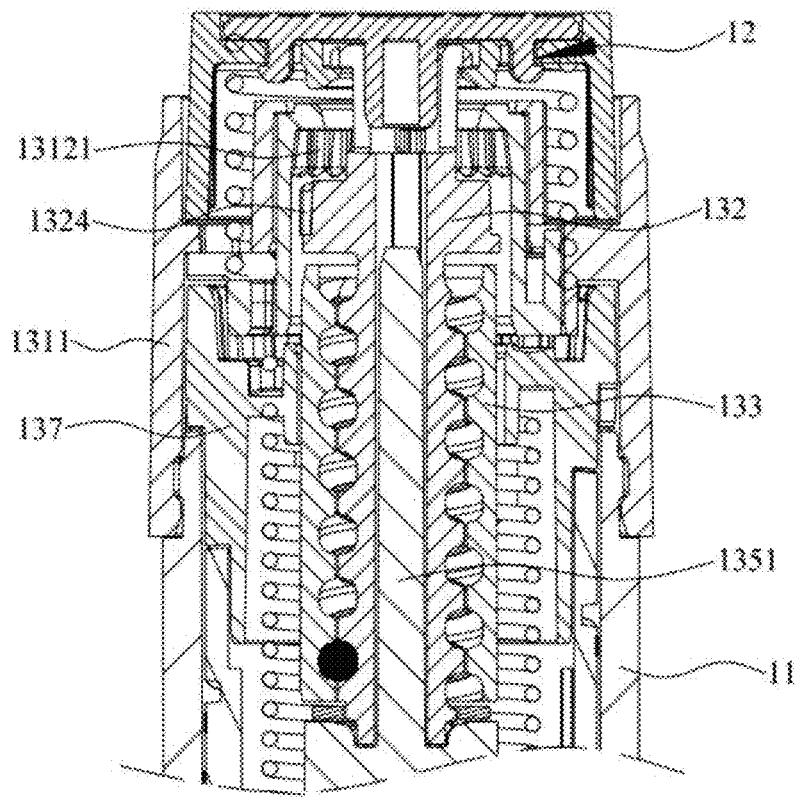
FIG. 9 is a partial enlarged diagram of the matching part of the pressing mechanism and the dose adjustment mechanism when the injector pen shown in FIG. 1 is in the second state.
Figure 10:
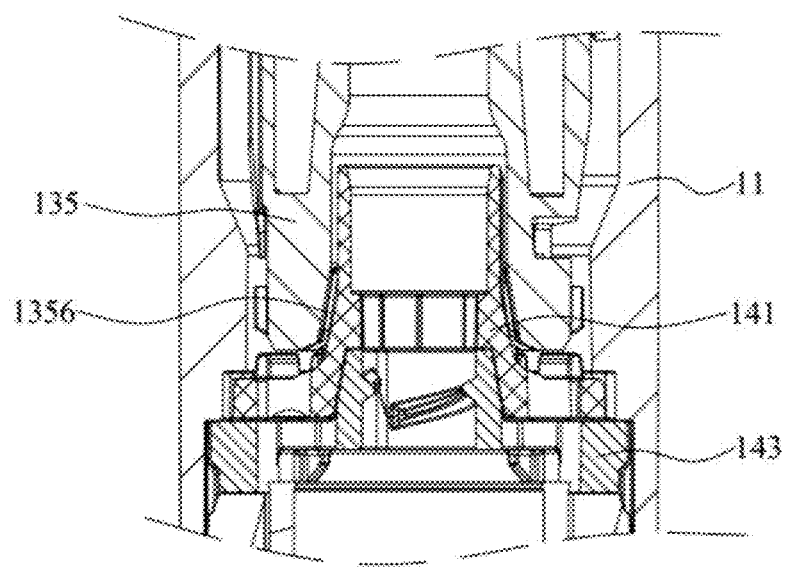
FIG. 10 is a partial enlarged diagram of the matching part of the sleeve and the driving wheel when the injector pen shown in FIG. 1 is in the second state.

Comparing FIG. 2 and FIG. 3 with FIG. 9 and FIG. 10, in FIG. 2 and FIG. 3, the injector pen 100 is in a first state where the power rod 132 and the knob assembly 131 are circumferentially limited, and the sleeve 135 and the driving wheel 141 are separated. FIG. 9 shows the second state where the circumferential limit of the power rod 132 and the knob assembly 131 is released after the button assembly 121 is pressed. It can be seen from the figure that the first latch tooth 1324 of the power rod 132 is separated from the first inner gear ring 13121 of the knob assembly 131. FIG. 10 shows that the sleeve 135 and the drive wheel 141 are in an engaged state after the button assembly 121 is pressed.

The specific structure and connection of the relevant parts of the lower pen cap assembly 20 of the injector pen 100 are not the core of the invention of the present application, and can be understood by referring to the conventional technology, and will not be described in detail here.

This article uses specific embodiments to explain principles and implementation methods of the present application. The description of the above embodiments is only configured to facilitate understanding the method and core idea of the present application. It should be pointed out that for ordinary skilled in the art, several improvements and modifications can be made to the present application without departing from the principles of the present application, and these improvements and modifications fall within the scope of protection of the claims of the present application.

The invention claimed is:

1. A dose adjustment mechanism of an injector pen, comprising:
   a power rod;
   a cylinder;
   a ball;
   a sleeve; and
   a torsion spring;
   wherein the cylinder is mounted outside the power rod, a spiral channel extending along an axis direction of the power rod is formed between an inner wall of the cylinder and an outer wall of the power rod, and the ball is rollable in the spiral channel;
   the cylinder and an upper pen holder of the injector pen are relatively fixed in a circumferential direction; an upper end of the torsion spring is relatively fixed to the upper pen holder, and an lower end of the torsion spring is connected to the sleeve;
   the power rod is rotatable relative to the cylinder under an action of external force; the sleeve is limitedly connected with the power rod in the circumferential direction, and the sleeve is configured for transmission cooperation with a transmission mechanism of the injector pen;
   the sleeve comprises a rod insertion portion, the power rod comprises a socket portion extending along the axial direction, the rod insertion portion is inserted into the socket portion, an outer peripheral wall of the rod insertion portion has a flat portion in the circumferential direction, and an inner hole wall of the socket portion has a flat wall that cooperates with the flat portion;
   the dose adjustment mechanism further comprises an axial limiting structure between the power rod and the sleeve, so as to limit a relative position of the power rod and the sleeve in the axial direction.

2. The dose adjustment mechanism according to claim 1, wherein one of the power rod and the sleeve is provided with a convex portion extending in a radial direction, and the other one of the power rod and the sleeve is provided with a concave portion, and the convex portion is configured to snap into the concave portion; the axial limiting structure comprises the convex portion and the concave portion.

3. The dose adjustment mechanism according to claim 2, wherein a bottom end of the power rod has an extension portion extending downward in the axial direction, the extension portion is provided with the concave portion, the sleeve comprises an inner cylinder portion, an inner cylinder wall of the inner cylinder portion close to a top end is provided with the convex portion extending inward in the radial direction.

4. The dose adjustment mechanism according to claim 3, wherein an outer wall of the sleeve near a bottom end is provided with a plurality of convex ribs extending outward in the radial direction, and the plurality of convex ribs are arranged along a circumferential direction of the sleeve to correct a concentricity degree between the sleeve and the upper pen holder.

5. The dose adjustment mechanism according to claim 3, further comprising a knob assembly, wherein a circumferential limiting structure is provided between the knob assembly and the power rod, and the knob assembly is configured to drive the power rod to rotate by the circumferential limiting structure.

6. The dose adjustment mechanism according to claim 3, further comprising a torsion spring bracket, wherein the torsion spring bracket is relatively fixed to the upper pen holder, and the cylinder is relatively fixed to the torsion spring bracket, the torsion spring bracket is connected to the upper end of the torsion spring.

7. An injector pen, comprising: an upper pen holder and a dose adjustment mechanism installed on the upper pen holder, wherein the dose adjustment mechanism is the dose adjustment mechanism according to claim 3.

8. The dose adjustment mechanism according to claim 2, wherein an outer wall of the sleeve near a bottom end is provided with a plurality of convex ribs extending outward in the radial direction, and the plurality of convex ribs are arranged along a circumferential direction of the sleeve to correct a concentricity degree between the sleeve and the upper pen holder.

9. The dose adjustment mechanism according to claim 2, further comprising a knob assembly, wherein a circumferential limiting structure is provided between the knob assembly and the power rod, and the knob assembly is configured to drive the power rod to rotate by the circumferential limiting structure.

10. The dose adjustment mechanism according to claim 2, further comprising a torsion spring bracket, wherein the torsion spring bracket is relatively fixed to the upper pen holder, and the cylinder is relatively fixed to the torsion spring bracket, the torsion spring bracket is connected to the upper end of the torsion spring.

11. An injector pen, comprising: an upper pen holder and a dose adjustment mechanism installed on the upper pen holder, wherein the dose adjustment mechanism is the dose adjustment mechanism according to claim 2.

12. The dose adjustment mechanism according to claim 1, wherein an outer wall of the sleeve near a bottom end is provided with a plurality of convex ribs extending outward in the radial direction, and the plurality of convex ribs are arranged along a circumferential direction of the sleeve to correct a concentricity degree between the sleeve and the upper pen holder.

13. An injector pen, comprising: an upper pen holder and a dose adjustment mechanism installed on the upper pen holder, wherein the dose adjustment mechanism is the dose adjustment mechanism according to claim 12.

14. The dose adjustment mechanism according to claim 1, further comprising a knob assembly, wherein a circumferential limiting structure is provided between the knob assembly and the power rod, and the knob assembly is configured to drive the power rod to rotate by the circumferential limiting structure.

15. The dose adjustment mechanism according to claim 14, wherein the power rod is configured to move relative to the cylinder towards a lower cap of the injector pen under an action of external force, to release a circumferential limit with the knob assembly.

16. An injector pen, comprising: an upper pen holder and a dose adjustment mechanism installed on the upper pen holder, wherein the dose adjustment mechanism is the dose adjustment mechanism according to claim 14.

17. The dose adjustment mechanism according to claim 1, further comprising a torsion spring bracket, wherein the torsion spring bracket is relatively fixed to the upper pen holder, and the cylinder is relatively fixed to the torsion spring bracket, the torsion spring bracket is connected to the upper end of the torsion spring.

18. An injector pen, comprising:
an upper pen holder; and
a dose adjustment mechanism installed on the upper pen holder, wherein the dose adjustment mechanism is the dose adjustment mechanism according to claim 1.

19. The injector pen according to claim 18, further comprising a transmission mechanism, wherein the sleeve is configured to move downward in the axial direction relative to the upper pen holder to engage with a driving wheel of the transmission mechanism, or to move upward in the axial direction relative to the upper pen holder to separate from the driving wheel; when the sleeve is in an engaged state with the driving wheel, the sleeve is configured to drive the driving wheel to rotate; the driving wheel comprises a cylindrical portion extending into the sleeve, and an outer peripheral wall of the cylindrical portion is provided with a plurality of convex ridges arranged in the circumferential direction, so as to correct the concentricity degree of the driving wheel and the sleeve.

20. The injector pen according to claim 19, wherein the driving wheel comprises a base portion fixedly connected to a lower end of the cylindrical portion, and a plurality of protrusions protruding upward in the axial direction are arranged near an outer edge of the base portion, and the plurality of protrusions are arranged in the circumferential direction to correct the concentricity degree of the driving wheel and the upper pen holder.

\* \* \* \* \*